(12) United States Patent
Kanphade

(10) Patent No.: US 10,336,169 B2
(45) Date of Patent: Jul. 2, 2019

(54) DOOR WEATHER STRIP

(71) Applicant: TOYODA GOSEI CO., LTD., Kiyosu-shi, Aichi-ken (JP)

(72) Inventor: Bhushan A Kanphade, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 163 days.

(21) Appl. No.: 15/664,103

(22) Filed: Jul. 31, 2017

(65) Prior Publication Data
US 2019/0031004 A1 Jan. 31, 2019

(51) Int. Cl.
*B60J 10/21* (2016.01)
*B60J 10/24* (2016.01)
*B60J 10/86* (2016.01)

(52) U.S. Cl.
CPC ............... *B60J 10/21* (2016.02); *B60J 10/24* (2016.02); *B60J 10/86* (2016.02)

(58) Field of Classification Search
CPC ............. B60J 10/21; B60J 10/24; B60J 10/86
See application file for complete search history.

(56) References Cited

U.S. PATENT DOCUMENTS

| | | | | |
|---|---|---|---|---|
| 3,837,957 A | * | 9/1974 | Mesnel | B29C 53/083 156/221 |
| 4,010,573 A | * | 3/1977 | Andrzejewski | B60J 10/24 428/122 |
| 4,708,898 A | * | 11/1987 | Gommier | E06B 7/2309 428/122 |
| 5,269,101 A | * | 12/1993 | Nozaki | B60J 10/21 49/479.1 |
| 5,374,386 A | * | 12/1994 | Nagata | B29C 45/14409 264/145 |
| 5,618,608 A | * | 4/1997 | Teishi | B60J 10/24 428/122 |
| 5,839,232 A | * | 11/1998 | Backes | B60J 10/24 49/479.1 |
| 5,972,268 A | * | 10/1999 | Nakajima | B29C 45/14409 264/138 |

(Continued)

FOREIGN PATENT DOCUMENTS

| | | | | |
|---|---|---|---|---|
| DE | 102013102957 A1 | * | 10/2014 | ....... B29C 45/14409 |
| EP | 0427383 A2 | * | 5/1991 | ............. B29C 33/44 |

(Continued)

*Primary Examiner* — Catherine A Kelly
(74) *Attorney, Agent, or Firm* — Posz Law Group, PLC

(57) ABSTRACT

A door weather strip includes a molded portion and an insert member. The molded portion includes an attachment base, an extension, and a sealing portion. The sealing portion includes a sealing lip and a molded hollow sealing portion. The extension is divided by a slit into an inner peripheral portion and an outer peripheral portion. The insert member includes a base extending in the circumferential direction in the attachment base, an intermediate section extending in the circumferential direction in the inner peripheral portion, and a stay portion extending to the outer peripheral side in the outer peripheral portion. The width of at least the section of the stay portion that crosses the molded hollow sealing portion in the circumferential direction is set smaller than the widths in the circumferential direction of the base and the intermediate section.

7 Claims, 8 Drawing Sheets

(56) References Cited

U.S. PATENT DOCUMENTS

| | | | | |
|---|---|---|---|---|
| 6,189,951 | B1* | 2/2001 | Deguchi | B60J 10/235 296/146.9 |
| 6,393,766 | B2* | 5/2002 | Nozaki | B60J 10/24 49/475.1 |
| 6,395,355 | B1* | 5/2002 | Nakajima | B29C 45/14409 428/34.1 |
| 7,010,886 | B2* | 3/2006 | Deguchi | B60J 5/00 296/146.9 |
| 7,306,839 | B2* | 12/2007 | Kubo | B29C 45/14409 428/122 |
| 9,533,556 | B2* | 1/2017 | Samanci | B60J 10/21 |
| 9,669,692 | B2* | 6/2017 | Ranzau | B60J 10/21 |
| 9,956,858 | B2* | 5/2018 | Sobue | B60J 10/36 |
| 10,081,232 | B2* | 9/2018 | Ogawa | B60J 5/0479 |
| 2001/0054261 | A1* | 12/2001 | Nozaki | B60J 10/24 49/498.1 |
| 2003/0020301 | A1* | 1/2003 | Teishi | B60J 10/24 296/146.9 |
| 2004/0216384 | A1 | 11/2004 | Teramoto et al. | |
| 2004/0250474 | A1* | 12/2004 | Kubo | B29C 45/0053 49/479.1 |
| 2006/0162256 | A1* | 7/2006 | Tsuchida | B60J 10/79 49/479.1 |
| 2007/0068085 | A1* | 3/2007 | Ninomiya | B60J 10/16 49/489.1 |
| 2014/0059940 | A1* | 3/2014 | Eguchi | B60J 10/233 49/479.1 |
| 2017/0274749 | A1* | 9/2017 | Nawate | B60J 10/86 |
| 2017/0274750 | A1* | 9/2017 | Sobue | B60J 10/36 |
| 2017/0341496 | A1* | 11/2017 | Kojima | B60J 10/76 |

FOREIGN PATENT DOCUMENTS

| | | | | |
|---|---|---|---|---|
| FR | 2172703 | A5 * | 9/1973 | B60J 10/24 |
| FR | 2247341 | A1 * | 5/1975 | B29C 45/14409 |
| GB | 2329143 | A * | 3/1999 | B29C 45/14467 |
| GB | 2368876 | A * | 5/2002 | B60J 10/24 |
| JP | 08142672 | A * | 6/1996 | B60J 10/24 |
| JP | 11138552 | A * | 5/1999 | B29C 45/14409 |
| JP | 3261608 | B2 * | 3/2002 | |
| JP | 2004-314683 | A | 11/2004 | |
| JP | 3815189 | B2 * | 8/2006 | B60J 10/24 |

\* cited by examiner

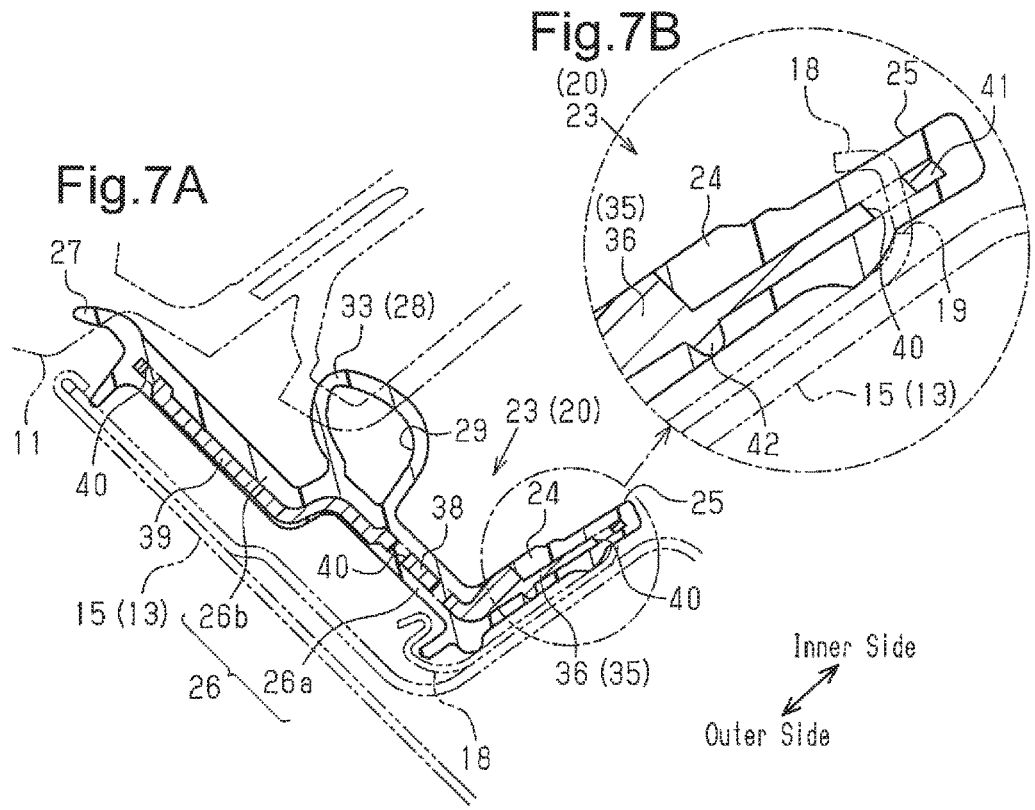
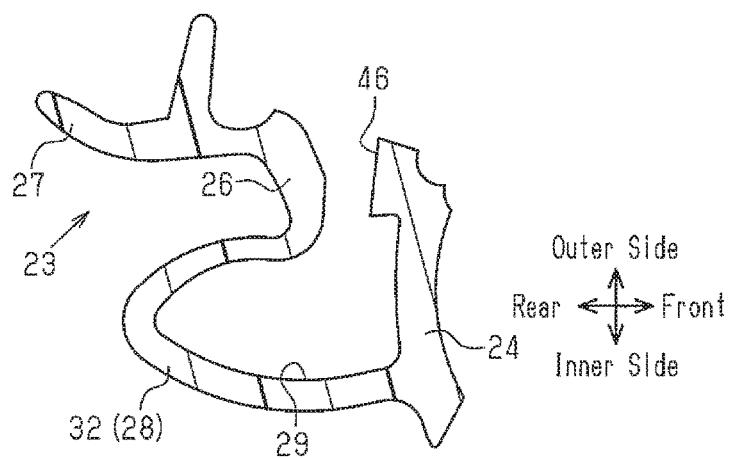

DOOR WEATHER STRIP

BACKGROUND OF THE INVENTION

The present invention relates to a door weather strip that is attached to the outer periphery of a door of a vehicle and seals the gap between the outer periphery of the door and the peripheral edge of an opening of the body of the vehicle when the opening is closed by the door.

Openings for boarding and exiting are formed in the body of a vehicle. Such openings are selectively opened and closed by doors. A door weather strip is attached to the outer periphery of the door to seal the gap between the outer periphery of the door and the peripheral edge of the opening at the time the opening is closed by the door. The door weather strip includes an extruded portion, which is formed by extrusion, and a molded portion, which is formed by molding using a mold. The extruded portion is a portion that is attached to a linear section of the outer periphery of the door, such as an upper edge and a vertical edge. The extruded portion includes an extruded hollow sealing portion. The molded portion is a portion that is attached to a corner between the upper edge and the vertical edge of the outer periphery of the door.

A door weather strip disclosed in Japanese Laid-Open Patent Publication No. 2004-314683 has a molded portion that is preferable for attachment to a lower rear corner of the outer periphery of a front door.

As shown in FIGS. 16 and 17, a molded portion 71 of a door weather strip 70 includes an attachment base 72, an extension 73, and a molded hollow sealing portion 74. The attachment base 72 configures an inner periphery of the molded portion 71 and is attached to the lower rear corner of a front door. The extension 73 extends from the attachment base 72 to the outer peripheral side. The molded hollow sealing portion 74 is formed in the outer periphery of the extension 73. A hollow portion 75 in the molded hollow sealing portion 74 communicates with a hollow portion 82 in an extruded hollow sealing portion 81 of each adjacent extruded portion 78. An insert member 77 is embedded in the region between the attachment base 72 and the molded hollow sealing portion 74 in the extension 73.

A slit 76, through which an inner core 83 (represented by the long dashed double-short dashed lines in FIG. 17) for forming a hollow portion is removed, is formed in a section in which the molded hollow sealing portion 74 is continuous with the extension 73. To avoid interference between the inner core 83 and the insert member 77 at the time of removing the inner core 83, the slit 76 is formed in a section on the outer side of the vehicle (the side corresponding to the front door, the left side as viewed in FIG. 17). A clip attachment hole 84 extends through the attachment base 72.

When the front door is closed, the molded hollow sealing portion 74 of the door weather strip 70 is pressed against the lower rear section of the peripheral edge of the opening to seal the gap between the lower rear corner of the front door and the lower rear section of the peripheral edge. The stiffness of the region between the attachment base 72 and the molded hollow sealing portion 74 in the extension 73 is improved by the insert member 77. The molded hollow sealing portion 74 is pressed against the lower rear section of the peripheral edge of the opening by great force. Sealing performance is thus improved.

The molded portion 71 of the above-described configuration may be employed as a molded portion attached to the rear upper corner of the outer periphery of the front door, which corresponds to the joint portion between the roof and the corresponding pillar of the vehicle body.

The surface of the peripheral edge of the opening of the vehicle body against which the molded hollow sealing portion 74 is pressed must be formed as a smooth surface to achieve a high sealing performance.

On the other hand, the aforementioned peripheral edge is formed by subjecting the body panel to drawing. A section close to both the roof and the pillar of the vehicle body in the upper rear section of the peripheral edge tends to be distorted easily compared with other sections. The section is thus difficult to smoothen through drawing.

Therefore, if the molded portion 71 disclosed in Japanese Laid-Open Patent Publication No. 2004-314683 is simply employed as the molded portion attached to the upper rear corner of the front door, the molded hollow sealing portion 74 is pressed against a non-smooth section of the upper rear section of the aforementioned peripheral edge. A high sealing performance is thus hard to achieve.

If the molded hollow sealing portion 74 is arranged in a section spaced from the extended end of the extension 73 to the inner peripheral side in the upper rear corner of the front door, the molded hollow sealing portion 74 is pressed against a smooth section of the upper rear section of the aforementioned peripheral edge to achieve high sealing performance. However, the insert member 77 crosses the molded hollow sealing portion 74. The insert member 77 thus interferes with removal of the inner core 83 from the molded hollow sealing portion 74, hampering the removal of the inner core 83.

If the insert member 77 does not cross the molded hollow sealing portion 74, the insert member 77 is unlikely to interfere with removal of the inner core 83, thus facilitating the removal of the inner core 83. However, since the insert member 77 is not embedded in a section on the outer peripheral side with respect to the molded hollow sealing portion 74 in the extension 73, the stiffness of this section is small. As a result, pressing the section against the upper rear section of the peripheral edge becomes difficult, thus hampering improvement of sealing performance.

A similar problem may occur to a molded portion arranged in the upper front corner in a door weather strip attached to the outer periphery of a rear door. Also in this upper front corner, a section close to both the roof and the corresponding pillar of the vehicle body tends to be distorted easily compared to other sections. The section is thus difficult to smoothen through drawing.

SUMMARY OF THE INVENTION

Accordingly, it is an objective of the present invention to provide a door weather strip capable of both facilitating removal of an inner core and ensuring a high sealing performance.

To achieve the foregoing objective and in accordance with one aspect of the present invention, a door weather strip is provided that is configured to seal a gap between an outer periphery of a door that selectively opens and closes an opening of a vehicle body and a peripheral edge of the opening. The door weather strip includes a molded portion and an insert member. The molded portion is formed by molding using a mold. The molded portion is arranged in a corner of the door corresponding to a joint portion between a roof and a pillar of the vehicle body in the peripheral edge of the opening. The insert member is embedded in the molded portion. The molded portion includes an attachment base that is attached to an inner periphery of the corner, an extension that extends from the attachment base to an outer peripheral side of the corner, and a sealing portion that is formed in the extension. The sealing portion includes a sealing lip that extends in a circumferential direction and a molded hollow sealing portion that has a hollow portion and extends in the circumferential direction on an inner side of the extension and on an inner peripheral side of the sealing lip. A slit through which an inner core for forming the hollow portion is removed is formed in a connecting portion of the molded hollow sealing portion that is connected to the extension. The extension is divided by the slit into an inner peripheral portion on the inner peripheral side of the slit and an outer peripheral portion on the outer peripheral side of the slit. The insert member includes a base that extends in the circumferential direction in the attachment base, an intermediate section that is continuous with the base and extends in the circumferential direction in the inner peripheral portion, and a stay portion that is continuous with the intermediate section and extends to the outer peripheral side in the outer peripheral portion. A width in the circumferential direction of at least a section of the stay portion that crosses the molded hollow sealing portion is set smaller than widths in the circumferential direction of the base and the intermediate section.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which:

FIG. 7A is a cross-sectional view taken along line 7A-7A of FIG. 4;

FIG. 7B is an enlarged partial cross-sectional view showing a section of FIG. 7A;

FIG. 8 is a cross-sectional view taken along line 8-8 of FIG. 4;

DETAILED DESCRIPTION OF THE PREFERRED EMBODIMENTS

An embodiment of a door weather strip will now be described with reference to FIGS. 1 to 15.

In the following description, the direction in which the automobile advances will be referred to as the front, and the reverse direction will be referred to as the rear. The middle of the width direction of the vehicle is used as the reference in the width direction of the vehicle. The side closer to the middle of the width direction will be referred to as the inner side of the vehicle, while the side farther from the middle of the width direction will be referred to the outer side of the vehicle. In each of the drawings, the inner side and outer side of the vehicle are denoted as "Inner Side," and "Outer Side, respectively."

Figure 1:
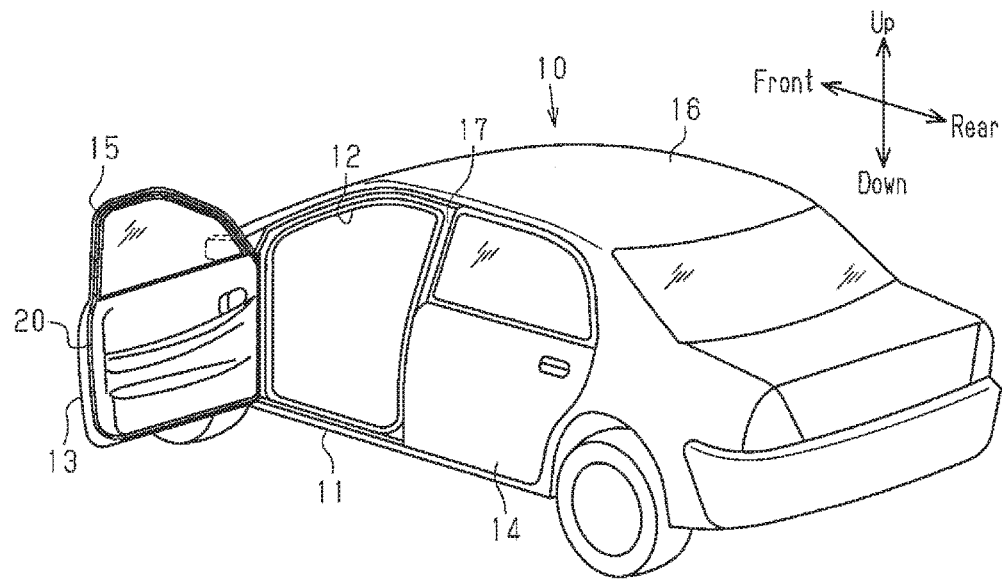
FIG. 1 is a perspective view showing a vehicle with an open front door.

As shown in FIG. 1, an opening 12 for boarding and exiting is formed in a body 11 of a vehicle 10. The opening 12 is selectively opened and closed by a door. The perspective view of FIG. 1 shows the vehicle 10 of which a front door 13 is open and a rear door 14 is closed.

A full loop door weather strip 20 is attached to the outer periphery of the front door 13. The door weather strip 20 seals the gap between the outer periphery of the front door 13 and the peripheral edge of the opening 12 when the opening 12 is closed by the front door 13. Although a similar door weather strip 20 is attached also to the outer periphery of the rear door 14, the present embodiment will be described with reference to the door weather strip 20 attached to the front door 13 by way of example.

Figure 3:
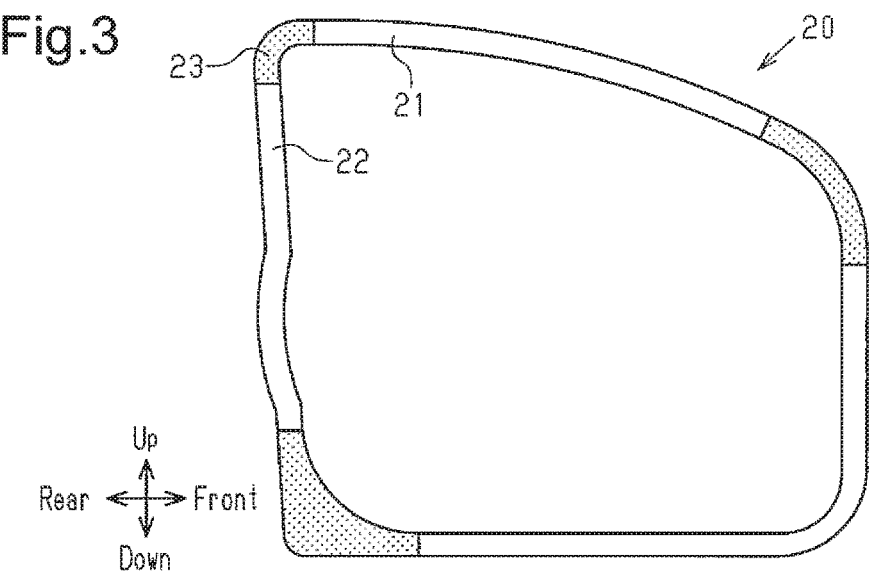
FIG. 3 is a diagram schematically illustrating the configuration of a door weather strip.

As shown in FIG. 3, to describe components of the door weather strip 20, the direction along the length of the door weather strip 20 will be referred to as the circumferential direction. Regarding the relationship between the inside region surrounded by the full loop door weather strip 20 and the outside region, the side toward the outside region with respect to the inside region will be referred to as the outer peripheral side. The side toward the inside region with respect to the outside region will be referred to as the inner peripheral side.

The door weather strip 20 includes multiple extruded portions and multiple molded portions, each of which is arranged between the corresponding adjacent pair of the extruded portions. FIG. 3 shows three extruded portions and three molded portions. The extruded portions are formed linearly in correspondence with the linear sections of the front door 13, including a vertical edge, an upper edge, and a lower edge.

Figure 10:
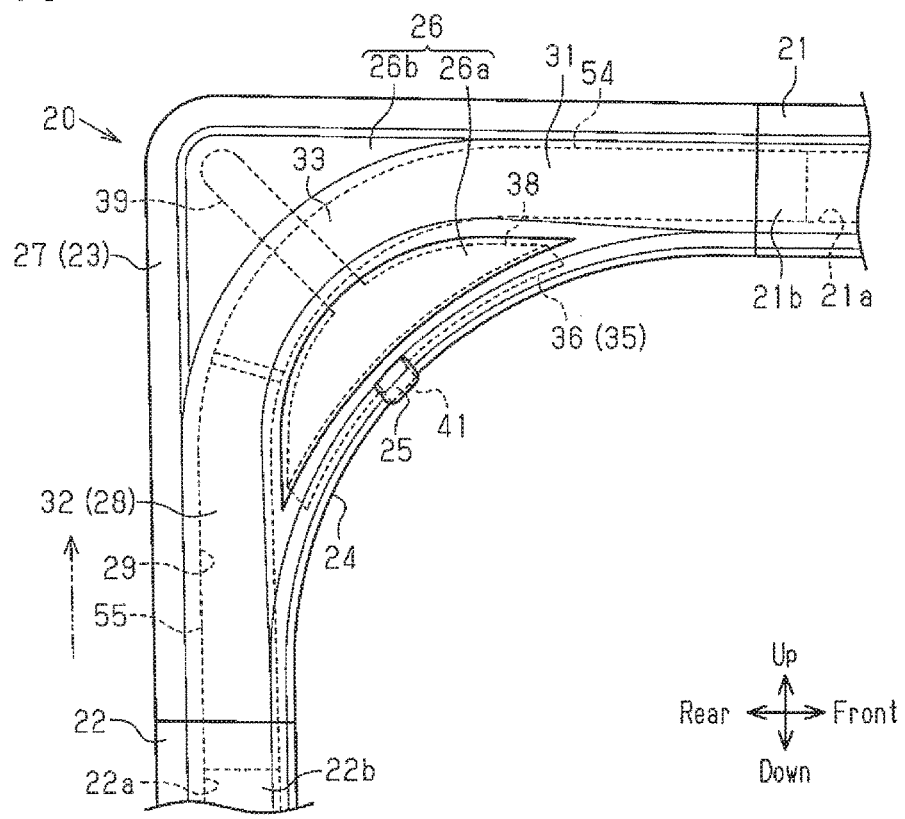
FIG. 10 is a partial side view illustrating the positional relationship among a first inner core, a second inner core, and an insert member in the door weather strip of FIG. 4.

One of the aforementioned extruded portions attached to the upper periphery of the front door 13 is configured by a first extruded portion 21. One of the extruded portions attached to the vertical edge on the rear side is configured by a second extruded portion 22. As shown in FIG. 10, the first extruded portion 21 extends in the front-rear direction and the second extruded portion 22 extends in the vertical direction. The first extruded portion 21 includes an extruded hollow sealing portion 21b having a hollow portion 21a inside. The second extruded portion 22 includes an extruded hollow sealing portion 22b having a hollow portion 22a inside.

Each of the molded portions is curved in correspondence with a curved portion, such as a corner of the outer periphery of the front door 13, and formed to be continuous with ends of corresponding adjacent ones of the extruded portions.

Figure 2:
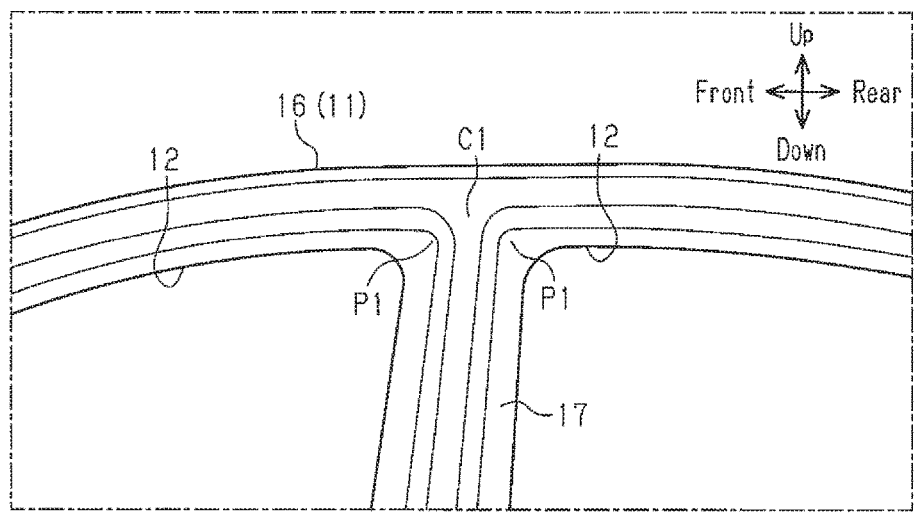
FIG. 2 is a partial side view showing a joint portion between the roof and the central pillar of the vehicle body as viewed from the outer side.
Figure 4:
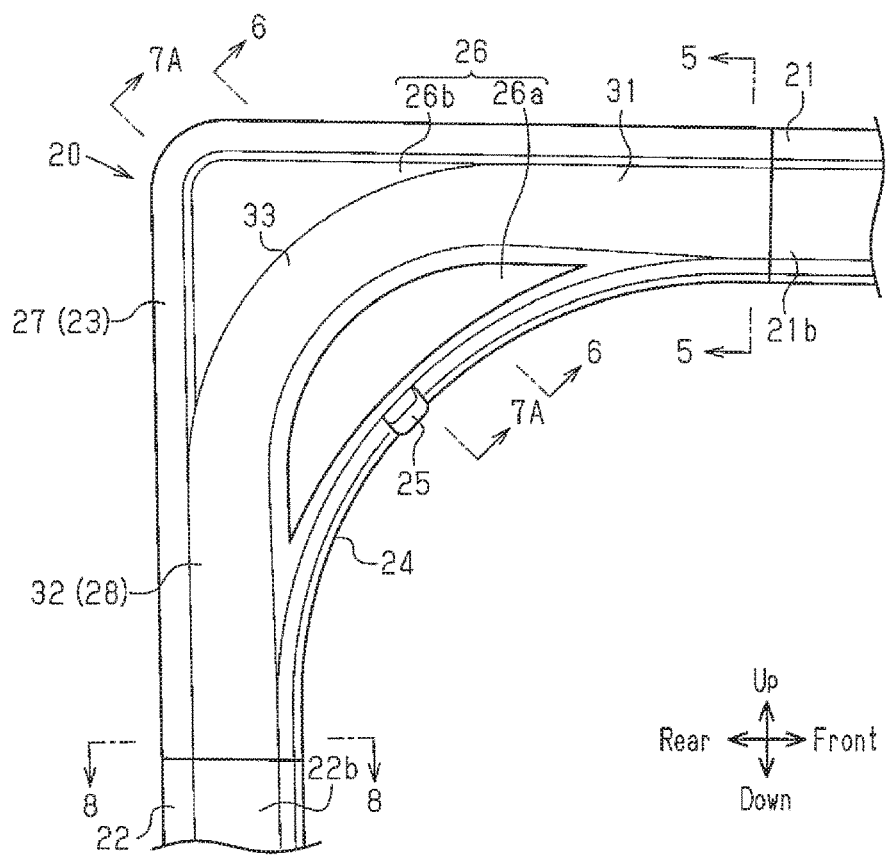
FIG. 4 is a partial side view showing a molded portion of the upper rear section of the door weather strip and the vicinity of the molded portion as viewed from the inner side.

FIG. 4 shows a molded portion 23, which is arranged in an upper rear corner 15 (see FIG. 9) of the outer periphery of the front door 13. The upper rear corner 15 is the one of the multiple corners of the outer periphery of the front door 13 that corresponds to a joint portion C1, which is between a roof 16 and a central pillar 17 of the body 11 and is shown in FIG. 2. The central pillar is referred to also as the B pillar.

As shown in FIG. 4, the molded portion 23 is formed in a shape corresponding to the upper rear corner 15. The molded portion 23 is connected to a rear end of the first extruded portion 21 and an upper end of the second extruded portion 22.

Figure 5:
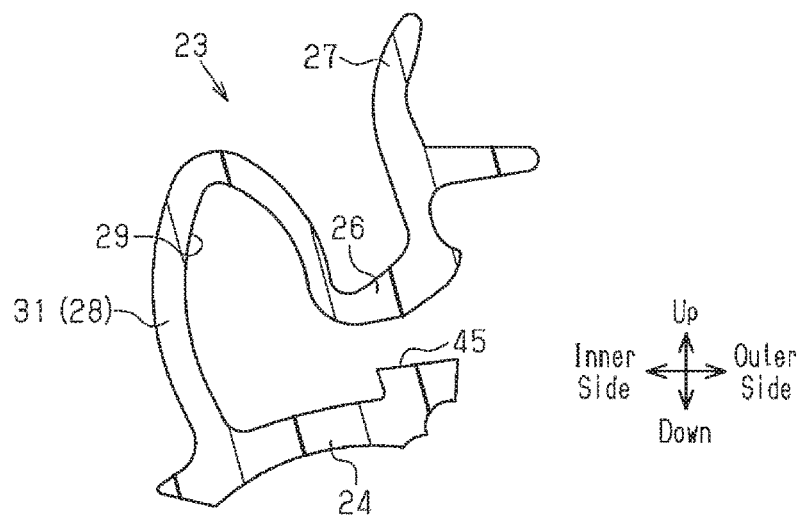
FIG. 5 is a cross-sectional view taken along line 5-5 of FIG. 4.

The cross-sectional configuration shown in FIG. 5 represents a front end of the molded portion 23. The first extruded portion 21 has a corresponding cross-sectional configuration similar to that of the drawing. The cross-sectional configuration shown in FIG. 8 represents a lower end of the molded portion 23. The second extruded portion 22 has a corresponding cross-sectional configuration similar to that of the drawing.

Figure 6:
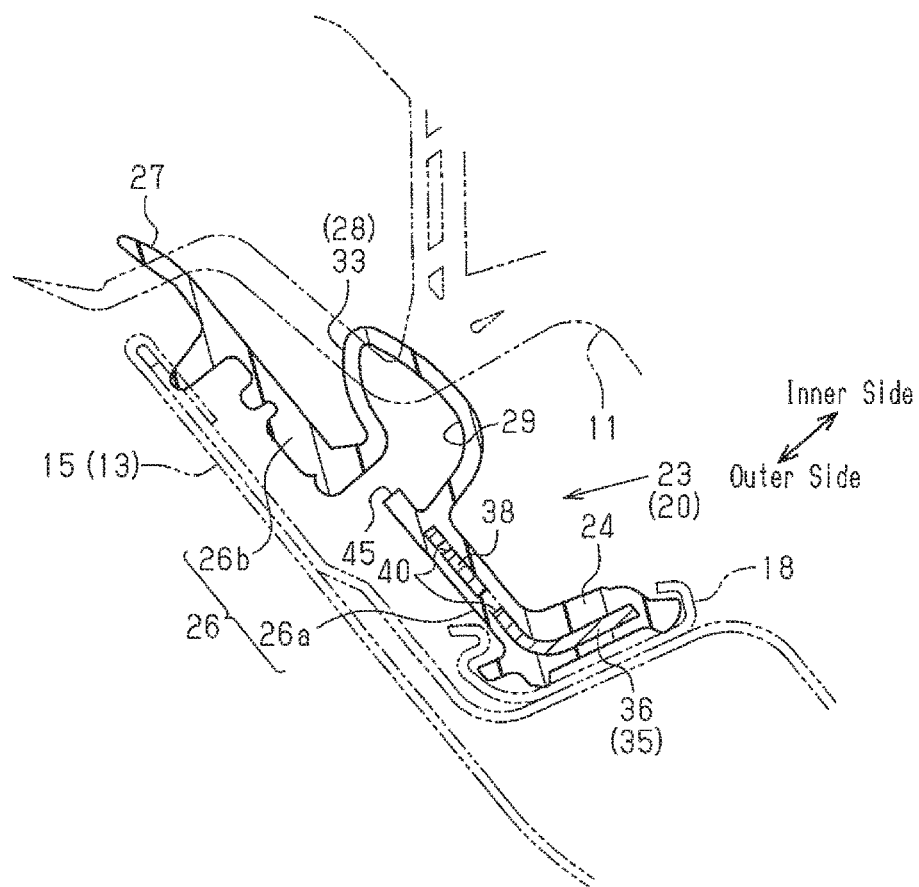
FIG. 6 is a cross-sectional view taken along line 6-6 of FIG. 4.

As shown in FIGS. 4, 6, and 7A, the molded portion 23 includes an attachment base 24, an extension 26, and a sealing portion. The attachment base 24 configures the innermost section of the molded portion 23 on the inner peripheral side. The attachment base 24 has a plate-like shape that extends substantially in the width direction of the vehicle and is curved in an arcuate shape to bugle in a diagonally upward and rearward as viewed from the side.

Figure 9:
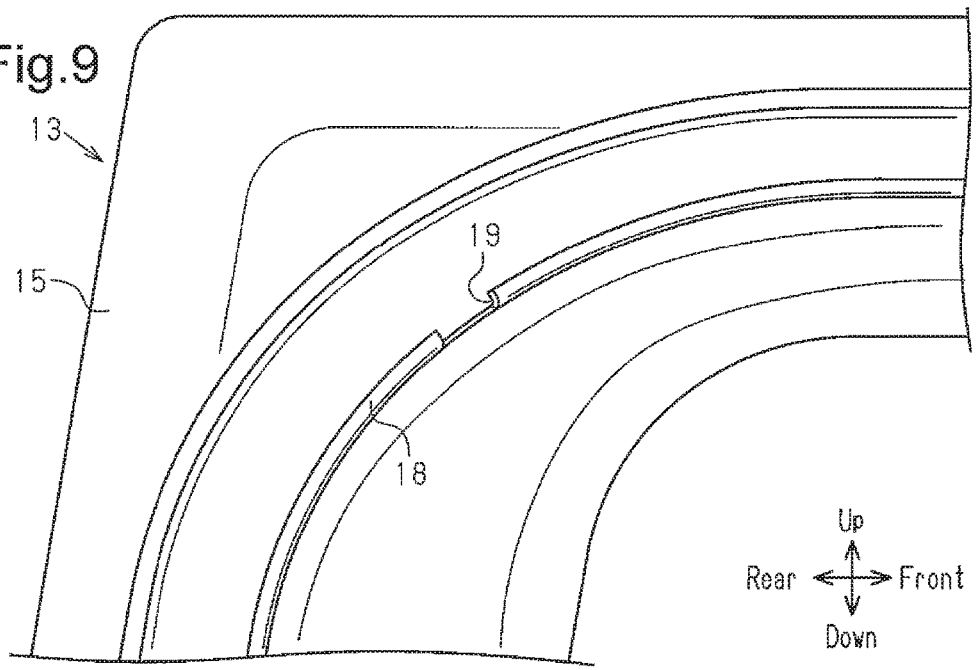
FIG. 9 is a partial side view showing an upper rear section of the front door as viewed from the inner side.

As shown in FIGS. 6, 7A, and 9, a retainer 18, which is formed by a metal plate or the like, is fixed to the outer periphery of the front door 13. The opposite side sections of the retainer 18 in the vehicle width direction are bent. The retainer 18 thus has a substantially C-shaped cross-sectional shape that has an open portion on the outer peripheral side. The attachment base 24 is attached to the upper rear corner 15 by being fitted in the retainer 18.

As shown in FIGS. 4, 6, and 7A, the extension 26 extends from the attachment base 24 in a diagonally upward and rearward direction, which is a direction toward the outer peripheral side, and is bent with respect to the attachment base 24. The extended end of the extension 26 is curved at a small radius of curvature.

The extending length of the extension 26 from the attachment base 24 is minimum in the opposite ends of the molded portion 23 in the circumferential direction and becomes greater as the distance from the ends increases. That is, the extending length of the extension 26 from the attachment base 24 is maximum in the middle section of the molded portion 23 in the circumferential direction.

The sealing portion includes a sealing lip 27 and a molded hollow sealing portion 28, both of which are formed in the extension 26. The sealing lip 27 has a plate-like shape and extends from the extended end of the extension 26 to the outer peripheral side.

The molded hollow sealing portion 28 is arranged between the attachment base 24 and the sealing lip 27 on the inner side (the side corresponding to the body 11) with respect to the extension 26. The molded hollow sealing portion 28 has a hollow portion 29 inside. The molded hollow sealing portion 28 is continuous with the extension 26 through a section of an outer peripheral surface of the molded hollow sealing portion 28 on the outer side.

The opposite side sections of the molded hollow sealing portion 28 in the circumferential direction are formed by a first linear section 31 adjacent to the first extruded portion 21 and a second linear section 32 adjacent to the second extruded portion 22. The first linear section 31 extends in the front-rear direction and is connected to the extruded hollow sealing portion 21b. The second linear section 32 extends in the vertical direction and is connected to the extruded hollow sealing portion 22b. The hollow portion 29 of the molded hollow sealing portion 28 communicates with the hollow portion 21a of the extruded hollow sealing portion 21b and the hollow portion 22a of the extruded hollow sealing portion 22b (see FIG. 10).

The region between the first linear section 31 and the second linear section 32 in the molded hollow sealing portion 28 is formed by a curved portion 33. The curved portion 33 is curved to bulge diagonally upward and rearward at a radius of curvature slightly smaller than that of the attachment base 24 as viewed from the side.

The first extruded portion 21, the second extruded portion 22, and the molded portion 23 are formed of rubber material such as ethylene-propylene-diene copolymer (EPDM), thermoplastic elastomer such as thermoplastic olefin (TPO), or foamed material of these materials. In the present embodiment, the molded portion 23 and the like are formed of EPDM.

As shown in FIG. 2, the section of the peripheral edge of the opening 12 of the body 11 against which the molded hollow sealing portion 28 is pressed is formed by subjecting the body panel to drawing. Sections P1, each of which is close to the joint portion C1 between the roof 16 and the central pillar 17 of the body 11, in other words, close to both the roof 16 and the central pillar 17, tend to be distorted easily compared to other sections. The sections P1 are thus difficult to smoothen through drawing. Such difficulty becomes more pronounced toward the joint portion C1.

To solve this problem, as shown in FIGS. 1, 6, and 7A, in a state in which the front door 13 is closed, the extended end of the extension 26 is located in a section that corresponds to the section P1. The curved portion 33 of the molded hollow sealing portion 28 is formed in a section spaced from the extended end to the inner peripheral side in the extension 26. A middle section of the curved portion 33 in the circumferential direction is located in a middle section of the extension 26 in its extending direction.

As shown in FIGS. 5, 6, 8, and 11, a first slit 45 and a second slit 46 are formed in the connecting portion of the molded hollow sealing portion 28 connected to the extension 26. The first and second slits 45, 46 are located at the positions closer to the front door 13 than the hollow portion 29, that is, on the outer side of the hollow portion 29.

As shown in FIGS. 5, 6, 10, and 11, the first slit 45 is employed to remove a first inner core 54, which is used to form a section of the hollow portion 29 as will be described later, from the molded hollow sealing portion 28. Most of the first slit 45 except for the rear section has a linear shape extending in the front-rear direction. The rear section of the first slit 45 is curved to bulge diagonally upward and rearward. A front end of the first slit 45 is located at the boundary portion of the molded hollow sealing portion 28 with the extruded hollow sealing portion 21b. A rear end of the first slit 45 is located in a section that is close to a stay portion 39, which will be described later, on the front side.

Figure 11:
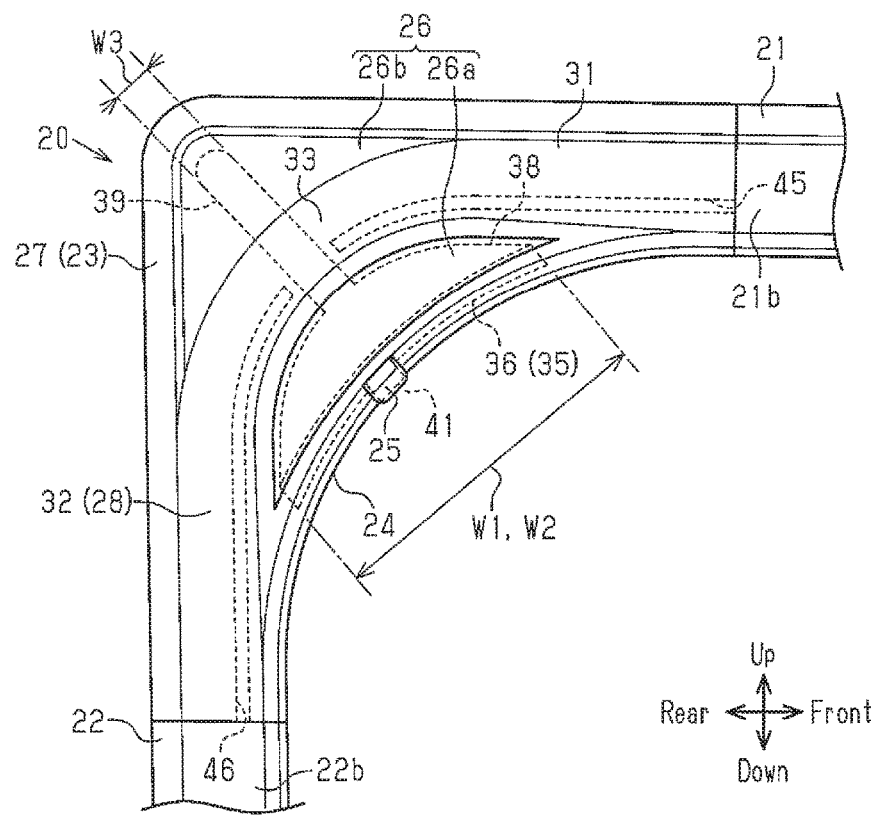
FIG. 11 is a partial side view illustrating the positional relationship among a first slit, a second slit, and the insert member in the door weather strip of FIG. 4.

As shown in FIGS. 8, 10, and 11, the second slit 46 is employed to remove a second inner core 55, which is used to form a section of the hollow portion 29 as will be described later, from the molded hollow sealing portion 28. Most of the second slit 46 except for the upper section has a linear shape extending in the vertical direction. The upper section of the second slit 46 is curved to bulge diagonally upward and rearward. A lower end of the second slit 46 is located in the boundary portion of the molded hollow sealing portion 28 with respect to the extruded hollow sealing portion 22*b*. An upper end of the second slit 46 is located in a section that, is close to the stay portion 39 on the lower side.

In these manners, the first slit 45 and the second slit 46 are located on the opposite sides of the stay portion 39 in the circumferential direction.

The section of the extension 26 on the inner peripheral side with respect to the first and second slits 45, 46 will be referred to as "an inner peripheral portion 26*a*" and the section of the extension 26 on the outer peripheral side with respect to the first and second slits 45, 46 will be referred to as "an outer peripheral portion 26*b*", to distinguish these sections from each other. The extension 26 is split into the inner peripheral portion 26*a* and the outer peripheral portion 26*b* by the first and second slits 45, 46. An inner peripheral edge of the inner peripheral portion 26*a* has an arcuate shape. An outer peripheral edge of the inner peripheral portion 26*a* has an arcuate shape with a radius of curvature slightly smaller than that of the inner peripheral edge. An inner peripheral edge of the outer peripheral portion 26*b* has an arcuate shape. An outer peripheral edge of the outer peripheral portion 26*b* has an arcuate shape with a radius of curvature smaller than that of the inner peripheral edge. The inner peripheral portion 26*a* and the outer peripheral portion 26*b* are both formed without a projecting portion unlike the molded hollow sealing portion 28.

As shown in FIGS. 6, 7A, and 11, an insert member 35 is embedded in the molded portion 23. The insert member 35 is formed using material with a higher stiffness or a higher hardness than the material used to form the molded portion 23. The material of the insert member 35 may be metal material such as an aluminum alloy or a plastic such as polyimide or polyester.

The insert member 35 includes a base 36, an intermediate section 38, and the stay portion 39. The base 36 has a plate-like shape that extends substantially in the vehicle width direction. Like the attachment base 24, the base 36 is curved in an arcuate shape to bulge diagonally upward and rearward as viewed from the side. Most of the base 36 extends in the circumferential direction in the attachment base 24.

The intermediate section 38 is continuous with and bent with respect to the base 36. The intermediate section 38 as a whole has a shape similar to the shape of the inner peripheral portion 26*a* as viewed from the side and extends in the circumferential direction in the inner peripheral portion 26*a*. The width W2 of the intermediate section 38 in the circumferential direction is set equal or approximately equal to the width W1 of the base 36 in the circumferential direction.

The stay portion 39 starts in a middle section of the intermediate section 38 in the circumferential direction, projects on the outer side of the molded hollow sealing portion 28, and extends diagonally upward and rearward, which is on the outer peripheral side, in the outer peripheral portion 26*b*. The stay portion 39 crosses a middle section of the curved portion 33 in the circumferential direction. The extended end of the stay portion 39 is arranged at a position close to the extended end of the extension 26 in the outer peripheral portion 26*b*.

The circumferential width W3 of at least the section of the stay portion 39 crossing the curved portion 33 is set smaller than the width W1 of the base 36 and the width W2 of the intermediate section 38. In the present embodiment, the circumferential width of the section of the stay portion 39 that does not cross the molded hollow sealing portion 28 is set equal or approximately equal to the width W3.

Multiple holes 40, which extend through the insert member 35 in the thickness direction, are formed in the insert member 35.

As shown in FIGS. 4, 7B, and 9, a means for positioning the molded portion 23 with respect to the upper rear corner 15 at the time of attaching the door weather strip 20 to the front door 13 is provided.

An engagement portion 19, which is configured by a cutout portion, is formed in a section of the retainer 18 on the inner side in the circumferential direction. A positioning portion 25, which is configured by a projection projecting toward the inner side, is formed in a middle section of the attachment base 24 in the circumferential direction. A projecting portion 41, which projects toward the inner side, is formed in a middle section of the base 36 of the insert member 35 in the circumferential direction. The projecting portion 41 is embedded in the positioning portion 25. The dimension of the positioning portion 25 in the circumferential direction is set approximately equal to the dimension of the engagement portion 19 in the circumferential direction. The attachment base 24 is fitted in the retainer 18 in a state in which the positioning portion 25 is engaged with the engagement portion 19.

Next, operation and advantages of the door weather strip 20 of the present embodiment, which is configured in the above-described manner, will be described for different conditions.

<Formation of Extruded Portions>

The first extruded portion 21 and the second extruded portion 22 are formed by performing a known extrusion method using a non-illustrated extrusion machine.

<Formation of Molded Portion 23>

Figure 12:
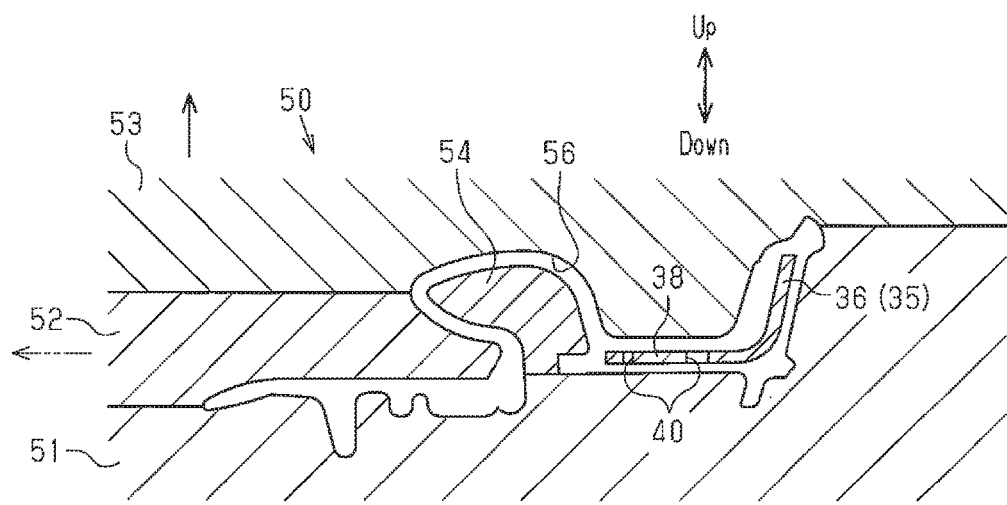
FIG. 12 is a partial cross-sectional view illustrating a clamped state of a molding device for forming a molded portion.

To form the molded portion 23, a molding device 50, which is shown in FIG. 12, is used. The molding device 50 includes a fixed mold 51, two types of movable molds, and two inner cores. The two types of movable molds are a first movable mold 52 and a second movable mold 53. The first movable mold 52 is arranged above the fixed mold 51 in a horizontally movable manner. The second movable mold 53 is arranged above the fixed mold 51 and the first movable mold 52 in an ascendable/descendible manner. A molding surface corresponding to the shape of the outline of the molded portion 23 is formed in each of the fixed mold 51, the first movable mold 52, and the second movable mold 53.

The two inner cores are a first inner core 54 and a second inner core 55, each of which is attached to the fixed mold 51 in a detachable manner.

As shown in FIG. 10, a section of the first inner core 54 on the side corresponding to the first extruded portion 21 is linear. A section of the first inner core 54 on the side corresponding to the second extruded portion 22 is curved. In contrast, most of the second inner core 55 is linear. The second inner core 55 is formed shorter in the circumferential direction than the first inner core 54.

As shown in FIGS. 10 and 12, most of the first inner core 54 except for the end on the side corresponding to the first extruded portion 21 and most of the second inner core 55 except for the end on the side corresponding to the second extruded portion 22 are both arranged to be spaced from the aforementioned molding surfaces in the space surrounded by the fixed mold 51, the first movable mold 52, and the second movable mold 53. The molding surfaces and the outer surfaces of the first inner core 54 and the second inner core 55 form a cavity 56, which is space for molding the molded portion 23.

To start forming the molded portion 23 using the molding device 50, the molding device 50 is opened. More specifically, the second movable mold 53 is moved in the direction represented by the solid arrow in FIG. 12. The first movable mold 52 is moved in the direction represented by the long dashed double-short dashed arrow in FIG. 12.

Then, in a state in which the first inner core 54 and the second inner core 55 are detached from the fixed mold 51, the insert member 35 is arranged in the fixed mold 51. Such arrangement is brought about in a state in which most of the insert member 35 is slightly spaced from the molding surface of the fixed mold 51. That is, protrusions 42 (see FIG. 7B), which project in the thickness direction of the insert member 35, are formed on multiple sections of the insert member 35. The insert member 35 is arranged in the foxed mold 51 in a state in which these protrusions 42 are held in contact with the molding surface of the fixed mold 51.

Subsequently, in a state in which the first inner core 54 and the second inner core 55 are arranged close to or held in contact with each other, the first and second inner cores 54, 55 are attached to the fixed mold 51. The first inner core 54 is in a state crossing the stay portion 39 of the insert member 35 in the circumferential direction. The corresponding end of the extruded hollow sealing portion 21b is fitted in the one of the opposite ends of the first inner core 54 farther from the stay portion 39. The corresponding end of the extruded hollow sealing portion 22b is fitted in the one of the opposite ends of the second inner core 55 farther from the stay portion 39.

Next, as shown in FIG. 12, the molding device 50 is clamped. The cavity 56 is thus formed in the clearance among the fixed mold 51, the first movable mold 52, and the second movable mold 53 around the first inner core 54 and the second inner core 55.

EPDM in a plasticized state is injected through a non-illustrated injection gate to fill the cavity 56. The holes 40 of the insert member 35 are also filled with the EPDM, which is in the plasticized state. The EPDM is then vulcanized and solidified. The EPDM on the opposite sides of the insert member 35 in the thickness direction is vulcanized and solidified in a state joined by the EPDM in the holes 40. When solidification is complete, the molded portion 23, which is continuous and is integral with the first extruded portion 21 and the second extruded portion 22 and in which the insert member 35 is embedded, is formed between the first extruded portion 21 and the second extruded portion 22.

Then, the molding device 50 is opened. The second movable mold 53 is moved in the direction represented by the solid arrow in FIG. 12. The first movable mold 52 is moved in the direction represented by the long dashed double-short dashed arrow in FIG. 12.

Figure 13:
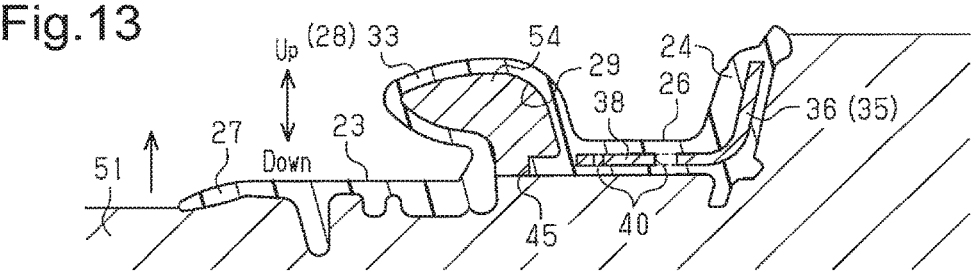
FIG. 13 is a partial cross-sectional view illustrating a state in which the molding device of FIG. 12 is being opened.

After such movement, the molded portion 23, as shown in FIGS. 10 and 13, is in a state covering the fixed mold 51, most of the first inner core 54, and most of the second inner core 55.

Figure 14:
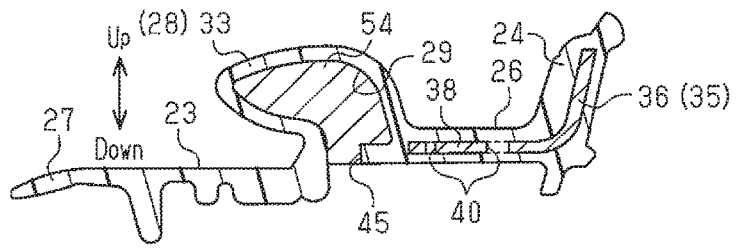
FIG. 14 is a partial cross-sectional view illustrating a state before removal of the first inner core from a molded hollow sealing portion of the door weather strip.

As shown in FIGS. 10 and 14, the first inner core 54, which is covered by a section of the molded hollow sealing portion 28 with the extruded hollow sealing portion 21b fitted in the end of the first inner core 54 farther from the stay portion 39, and the second inner core 55, which is covered by a section of the molded hollow sealing portion 28 with the extruded hollow sealing portion 22b fitted in the end of the second inner core 55 farther from the stay portion 39, are detached from the fixed mold 51.

Figure 15:
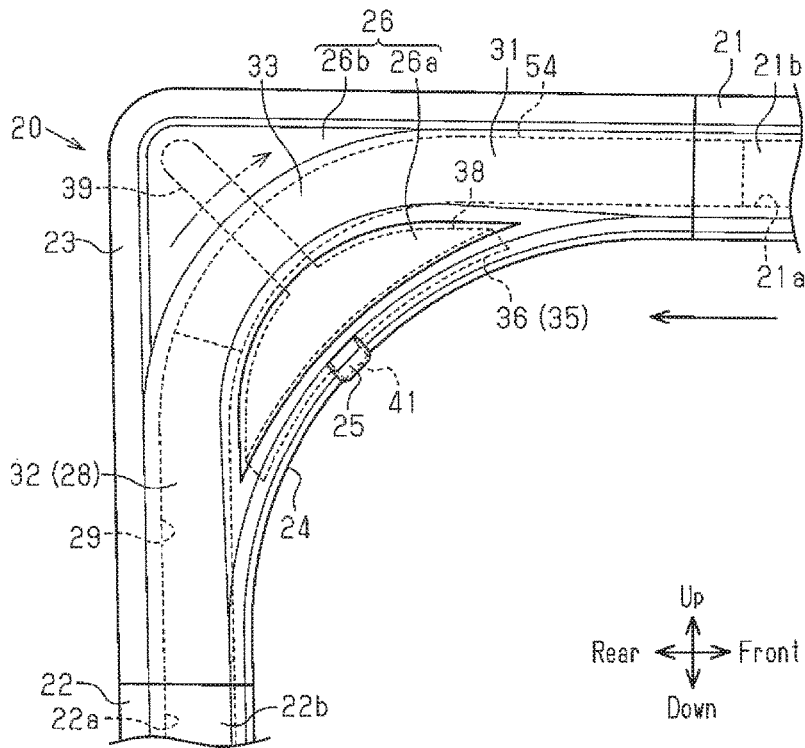
FIG. 15 a partial cross-sectional view illustrating a state after removal of the second inner core from the molded hollow sealing portion of FIG. 10.
Figure 16:
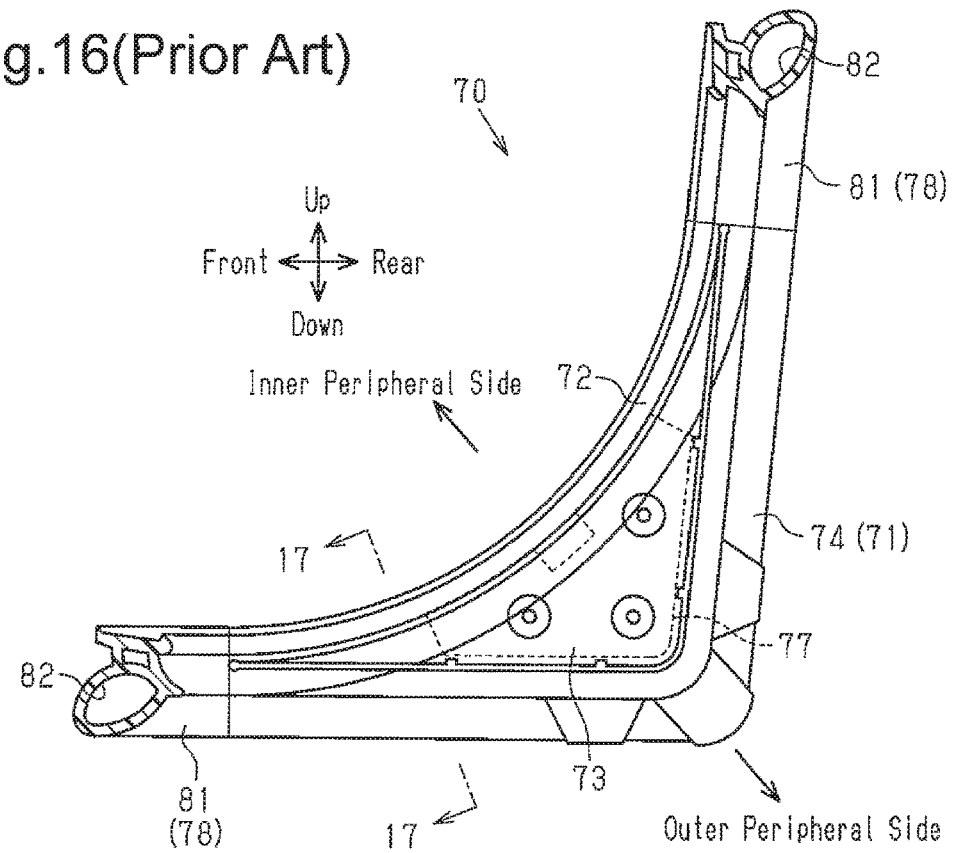
FIG. 16 is a partial side view showing a molded portion of a conventional door weather strip and the vicinity of the molded portion as viewed from the outer side.
Figure 17:
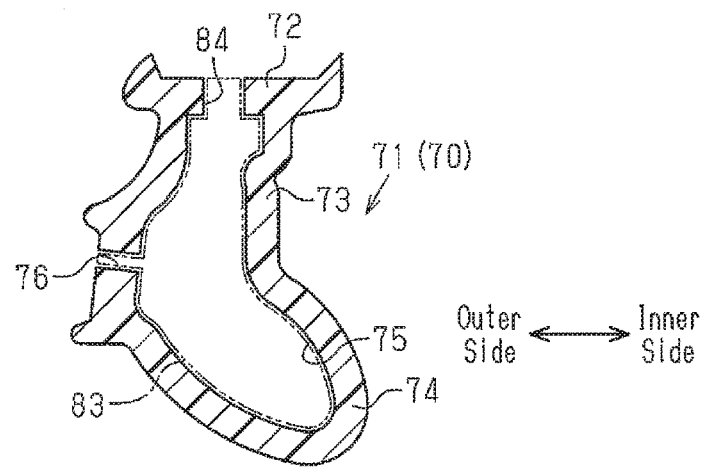
FIG. 17 is a cross-sectional view taken along line 17-17 of FIG. 16.

Subsequently, the first inner core 54 and the second inner core 55 are removed from the hollow portion 29 of the molded hollow sealing portion 28. First, the second inner core 55, which does not cross the stay portion 39 and is shorter than the first inner core 54, is removed. The slit 46 is widened and the section of the second inner core 55 located in the molded hollow sealing portion 28 is moved in the direction represented by the long dashed double-short dashed arrow in FIG. 10, while being pulled to the exterior of the molded hollow sealing portion 28 through the second slit 46. As a result, as shown in FIG. 15, while being removed from the molded hollow sealing portion 28, the second inner core 55 is pulled out from the extruded hollow sealing portion 22b.

Next, the first inner core 54, which crosses the stay portion 39 and is longer than the second inner core 55, is removed from the hollow portion 29 of the molded hollow sealing portion 28. Specifically, the section of the first inner core 54 located in the molded hollow sealing portion 28 is moved in the circumferential direction represented by the solid arrow in FIG. 15. As a result, the first inner core 54 is pulled out from the extruded hollow sealing portion 21b.

At this stage, the section of the stay portion 39 that crosses the curved portion 33 interferes with the removal of the first inner core 54. The first inner core 54 cannot be removed unless the state in which the first inner core 54 crosses the stay portion 39 is canceled. To remove the first inner core 54, the first inner core 54 needs to be moved in the circumferential direction to such a position that the first inner core 54 does not cross the stay portion 39. The greater the circumferential width of the section of the stay portion 39 that crosses the curved portion 33, the greater the extent of such interference becomes.

However, in the present embodiment, as shown in FIG. 11, the circumferential width W3 of at least the section of the stay portion 39 that crosses the molded hollow sealing portion 28 (the curved portion 33) is smaller than the width W1 of the base 36 and the width W2 of the intermediate section 38. The extent of interference by the stay portion 39 with the removal of the first inner core 54 is thus decreased compared to a case in which the aforementioned width W3 is equal to or greater than the widths W1, W2. This decreases the amount of movement of the first inner core 54 in the circumferential direction necessary to arrange the first inner core 54 not to cross the stay portion 39. As a result, operation for removing the first inner core 54 from the first slit 45 is facilitated.

While being pulled to the exterior of the molded hollow sealing portion 28 through the first slit 45, the first inner core 54 is moved in the direction represented by the long dashed double-short dashed arrow in FIG. 15. The first inner core 54 is removed from the molded hollow sealing portion 28 after having been moved to such a position that the first inner core 54 does not cross the stay portion 39.

After the first and second inner cores 54, 55 are both removed from the molded hollow sealing portion 28 as has been described, the molded portion 23, which is continuous the first extruded portion 21 and the second extruded portion 22, is obtained.

In the obtained molded portion 23, the first slit 45 and the second slit 46 are spaced apart in the circumferential direction. The inner peripheral portion 26a and the outer peripheral portion 26b of the extension 26 are continuous with each other through the section between the first and second slits 45, 46. This restrains displacement of the inner peripheral portion 26a and the outer peripheral portion 26b in the vehicle width direction, compared to a case in which the first slit 45 and the second slit 46 are continuous with each other.

<Attachment of Molded Portion 23>

To attach the molded portion 23 to the upper rear corner 15 of the front door 13, the attachment base 24 is fitted in the retainer 18, as shown in FIG. 6. Prior to this, the positioning portion 25 of the attachment base 24 is engaged with the engagement portion 19 of the retainer 18, as shown in FIGS. 7B and 9. That is, the projection projecting from the attachment base 24 functions as the positioning portion 25 and the cutout portion formed in the retainer 18 functions as the engagement portion 19. Engagement of the projection with the cutout portion accomplishes positioning of the attachment base 24 with respect to the retainer 18 in the circumferential direction, as well as positioning of the molded portion 23 with respect to the upper rear corner 15 in the circumferential direction.

Then, in the state in which the positioning portion 25 is engaged with the engagement portion 19, the attachment base 24 is fitted in the retainer 18. As a result, the molded portion 23 is attached accurately to the target section of the upper rear corner 15.

Specifically, the projecting portion 41 of the insert member 35 improves the stiffness of the positioning portion 25. As a result, by engaging the positioning portion 25 with the engagement portion 19, the molded portion 23 is positioned with respect to the upper rear corner 15 with improved accuracy.

The stiffness of the molded portion 23 is improved by the insert member 35. More specifically, as shown in FIGS. 6, 7A, and 11, the stiffness of the attachment base 24 is improved by the base 36. The stiffness of the inner peripheral portion 26a of the extension 26 is improved by the intermediate section 38. The stiffness of the outer peripheral portion 26b of the extension 26 is improved by the stay portion 39. The positions and attachment states of the sealing lip 27 and the molded hollow sealing portion 28 are thus stabilized. Also, the shape of the extension 26 is stabilized and displacement of the extension 26 in the vehicle width direction is restrained.

<When the Opening 12 is Closed by the Front Door 13>

When the front door 13 is closed, the sealing lip 27 is pressed in an elastically deformed state against the section of the peripheral edge of the opening 12 on the outer side as shown in FIGS. 6 and 7A. The sealing lip 27 is highly flexible and becomes easily bent to be pressed against the section of the peripheral edge of the opening 12 on the outer side when the front door 13 is closed. This seals the gap between the upper rear corner 15 of the front door 13 and the upper rear section of the peripheral edge of the opening 12.

Further, the molded hollow sealing portion 28 is pressed, in an elastically deformed state, against the section of the aforementioned peripheral edge that is on the inner side and on the inner peripheral side with respect to the section against which the sealing lip 27 is pressed. This seals the gap between the upper rear corner 15 and the upper rear section of the peripheral edge of the opening 12.

In these manners, the sealing lip 27 and the molded hollow sealing portion 28, together with each other, perform double sealing.

In the aforementioned peripheral edge, the section against which the molded hollow sealing portion 28 is pressed is more spaced toward inner peripheral side from the joint portion C1, which is between the roof 16 and the central pillar 17 of the body 11, than the section P1 and is smoother than the section P1. This increases the contact area of the molded hollow sealing portion 28 with the peripheral edge compared to a case in which the molded hollow sealing portion 28 is pressed against the section P1. As a result, the sealing is performed with further improved sealing performance.

Also, the molded hollow sealing portion 28 has the hollow portion 29 and is highly flexible. As a result, even if there is variation in the shapes and dimensions of the upper rear corner portion 15 of the front door 13 and the peripheral edge, such variation is absorbed through elastic deformation of the molded hollow sealing portion 28. The molded hollow sealing portion 28 is thus flexibly pressed against the aforementioned peripheral edge regardless of the variation. This seals the gap between the upper rear corner 15 and the upper rear section of the peripheral edge with improved accuracy.

Further, in the present embodiment, the stiffness of the outer peripheral portion 26b of the extension 26 is improved by the stay portion 39. As a result, although the molded hollow sealing portion 28 and the sealing lip 27 are located at the positions spaced from the attachment base 24 and the intermediate section 38, the molded hollow sealing portion 28 and the sealing lip 27 are pressed against the upper rear section of the peripheral edge by sufficiently great force. This improves sealing performance by the molded hollow sealing portion 28 and the sealing lip 27, thus restricting entry of rain water or noise.

The present embodiment has the advantage described below, in addition to the above-described advantages.

A member independent from the molded portion 23 may be provided in the exterior of the molded portion 23 as a means for improving the stiffness of the molded portion 23. However, in this case, the independent member is exposed and deteriorates the aesthetic appearance. However, in the present embodiment, the insert member 35 is embedded in the molded portion 23. The insert member 35 thus cannot be seen and the outer appearance of the molded portion 23 is improved.

<Modifications>

It should be apparent to those skilled in the art that the present invention may be embodied in many other specific forms without departing from the scope of the invention. Particularly, it should be understood that the present invention may be embodied in the following forms.

To attach the attachment base 24 to the upper rear corner 15 of the front door 13, a double-faced adhesive tape, a clip, or a combination of these may be employed instead of the retainer 18. If a clip is used, the clip is attached to the attachment base 24 by being inserted into the attachment base 24. Then, the distal end of the clip is fitted in a receiving hole formed in the peripheral edge of the front door 13 such that the attachment base 24 is attached to the upper rear corner 15.

The molded portion 23 may be attached to the upper rear corner 15 of the front door 13 by means of the insert member 35, additionally to the attachment base 24. For example, a clip may be mounted in the insert member 35 and the distal end of the clip may be fitted in a receiving hole formed in the peripheral edge of the upper rear corner 15 such that the insert member 35 is attached to the upper rear corner 15. Alternatively, a protrusion corresponding to the clip may be formed on the insert member 35 and engaged with the peripheral edge of the upper rear corner 15 such that the insert member 35 is attached to the upper rear corner 15.

In these manners, the molded portion 23 is attached to the upper rear corner 15 in a further stabilized state.

The circumferential width of the section of the stay portion 39 that does not cross the molded hollow sealing portion 28 may be set greater than the width W3 of the section of the stay portion 39 that crosses the molded hollow sealing portion 28.

The molded hollow sealing portion 28 may be formed using three or more inner cores.

As long as the door weather strip 20 includes the first extruded portion 21, the molded portion 23, and the second extruded portion 22, the door weather strip 20 may be formed in a non-full loop shape.

The molded portion 23 may be employed as a molded portion arranged in an upper front corner of the door weather strip 20 when the door weather strip 20 is attached to the outer periphery of the rear door 14. Also in this upper front corner, the section close to both the roof 16 and the central pillar 17 of the body 11 tends to be distorted easily compared to other sections and is difficult to smoothen through drawing.

The present examples and embodiments are to be considered as illustrative and not restrictive, and the invention is not to be limited to the details given herein, but may be modified within the scope and equivalence of the appended claims.

The invention claimed is:

1. A door weather strip configured to seal a gap between an outer periphery of a door that selectively opens and closes an opening of a vehicle body and a peripheral edge of the opening, the door weather strip comprising:
   a molded portion formed by molding using a mold, wherein the molded portion is arranged in a corner of the door corresponding to a joint portion between a roof and a pillar of the vehicle body in the peripheral edge of the opening; and
   an insert member that is embedded in the molded portion, wherein
   the molded portion includes
      an attachment base that is attached to an inner periphery of the corner,
      an extension that extends from the attachment base to an outer peripheral side of the corner, and
      a sealing portion that is formed in the extension,
   the sealing portion includes
      a sealing lip that extends in a circumferential direction, and
      a molded hollow sealing portion that has a hollow portion and extends in the circumferential direction on an inner side of the extension and on an inner peripheral side of the sealing lip,
   a slit through which an inner core for forming the hollow portion is removed is formed in a connecting portion of the molded hollow sealing portion that is connected to the extension,
   the extension is divided by the slit into an inner peripheral portion on the inner peripheral side of the slit and an outer peripheral portion on the outer peripheral side of the slit,
   the insert member includes
      a base that extends in the circumferential direction in the attachment base,
      an intermediate section that is continuous with the base and extends in the circumferential direction in the inner peripheral portion, and
      a stay portion that is continuous with the intermediate section and extends to the outer peripheral side in the outer peripheral portion, and
   a width in the circumferential direction of at least a section of the stay portion that crosses the molded hollow sealing portion is set smaller than widths in the circumferential direction of the base and the intermediate section.

2. The door weather strip according to claim 1, wherein a width in the circumferential direction of a section of the stay portion that does not cross the molded hollow sealing portion is set smaller than the widths in the circumferential direction of the base and the intermediate section.

3. The door weather strip according to claim 1, wherein the inner core is a first inner core,
   the door weather strip further comprises a second inner core,
   the first inner core and the second inner core are arranged to be adjacent to each other in the circumferential direction, and
   only one of the first inner core and the second inner core is arranged to cross the stay portion.

4. The door weather strip according to claim 1, wherein the slit is split into a first slit and a second slit that extend in the circumferential direction and are arranged on opposite sides of the stay portion in the circumferential direction.

5. The door weather strip according to claim 1, wherein the attachment base includes a positioning portion that positions the molded portion with respect to the corner in the circumferential direction by being engaged with an engagement portion formed in the corner.

6. The door weather strip according to claim 5, wherein the positioning portion is configured by a projection projecting from the attachment base, and
   the engagement portion is configured by a cutout portion with which the projection is engaged.

7. The door weather strip according to claim 6, wherein the base includes a projecting portion, and
   the projecting portion is embedded in the positioning portion.

* * * * *